US012560949B2

(12) United States Patent
Yuet et al.

(10) Patent No.: US 12,560,949 B2
(45) Date of Patent: Feb. 24, 2026

(54) SYSTEM AND METHOD FOR DELIVERING BEAMS TO PREDETERMINED LOCATIONS OF WORK SITES

(71) Applicant: Caterpillar Inc., Peoria, IL (US)

(72) Inventors: Fu P. Yuet, Clayton, NC (US); Barrett A Flinn, Mount Holly, NC (US)

(73) Assignee: Caterpillar Inc., Peoria, IL (US)

( * ) Notice: Subject to any disclaimer, the term of this patent is extended or adjusted under 35 U.S.C. 154(b) by 178 days.

(21) Appl. No.: 18/589,475

(22) Filed: Feb. 28, 2024

(65) Prior Publication Data

US 2025/0271869 A1      Aug. 28, 2025

(51) Int. Cl.
| | |
|---|---|
| *G05D 1/667* | (2024.01) |
| *B65G 15/42* | (2006.01) |
| *B65G 43/08* | (2006.01) |
| *B65G 47/12* | (2006.01) |
| *B65G 47/24* | (2006.01) |
| *G05D 105/05* | (2024.01) |

(52) U.S. Cl.
CPC ............. *G05D 1/667* (2024.01); *B65G 15/42* (2013.01); *B65G 43/08* (2013.01); *B65G 47/12* (2013.01); *B65G 47/24* (2013.01); *G05D 2105/05* (2024.01)

(58) Field of Classification Search
CPC .... G05D 1/667; G05D 2105/05; B65G 15/42; B65G 43/08; B65G 47/12; B65G 47/24
See application file for complete search history.

(56) References Cited

U.S. PATENT DOCUMENTS 6,064,926 A      5/2000   Sarangapani et al.
8,545,162 B2   10/2013   Hackett et al.
(Continued)

FOREIGN PATENT DOCUMENTS

CN        111285137 A  *  6/2020   .............. B66F 9/063
CN        217289380 U      8/2022
(Continued)

OTHER PUBLICATIONS

Shields Magnetics, "All Terrain Magnetic Sweeper", Mar. 27, 2015, https://www.youtube.com/watch?v=kNv_CFBYL94, whole video (Year: 2015).*
(Continued)

*Primary Examiner* — Kenneth M Dunne

(57) ABSTRACT

A system for delivering beams to predetermined locations of a work site includes a sorting assembly, a work machine, and a control system. The sorting assembly receives the beams in loose batches and arranges them in a predefined arrangement. The work machine includes an implement having haul elements. The control system receives an instruction to transfer the beams to the predetermined locations and issue a command to move the work machine for operative engagement with the sorting assembly. Further, the control system generates a retrieval command to alter the implement and switch the haul elements to a first condition to retrieve the beams from the sorting assembly. Also, the control system provides a notification to haul the beams to the predetermined locations. The control system generates release commands at the predetermined locations to release at least one beam correspondingly at the predetermined locations in a preset orientation.

20 Claims, 12 Drawing Sheets

(56)  References Cited

U.S. PATENT DOCUMENTS

| | | | |
|---|---|---|---|
| 11,385,646 B2 | 7/2022 | Ready-Campbell et al. | |
| 2015/0368046 A1* | 12/2015 | LaPierre | B65G 37/00 |
| | | | 198/373 |
| 2022/0267131 A1* | 8/2022 | Magzimof | B66F 9/07581 |
| 2023/0278796 A1* | 9/2023 | Choi | B65G 1/0492 |
| 2024/0150159 A1* | 5/2024 | Melchior | B66F 9/24 |

FOREIGN PATENT DOCUMENTS

| | | | | | |
|---|---|---|---|---|---|
| CN | 115557181 A | * | 1/2023 | | B65G 35/00 |
| WO | WO-2024210286 A1 | * | 10/2024 | | B25J 11/008 |

OTHER PUBLICATIONS

Machine translation of CN-111285137-A (Year: 2020).*
Machine translation of CN-115557181-A (Year: 2023).*
Machine translation of WO-2024210286-A1 (Year: 2024).*

* cited by examiner

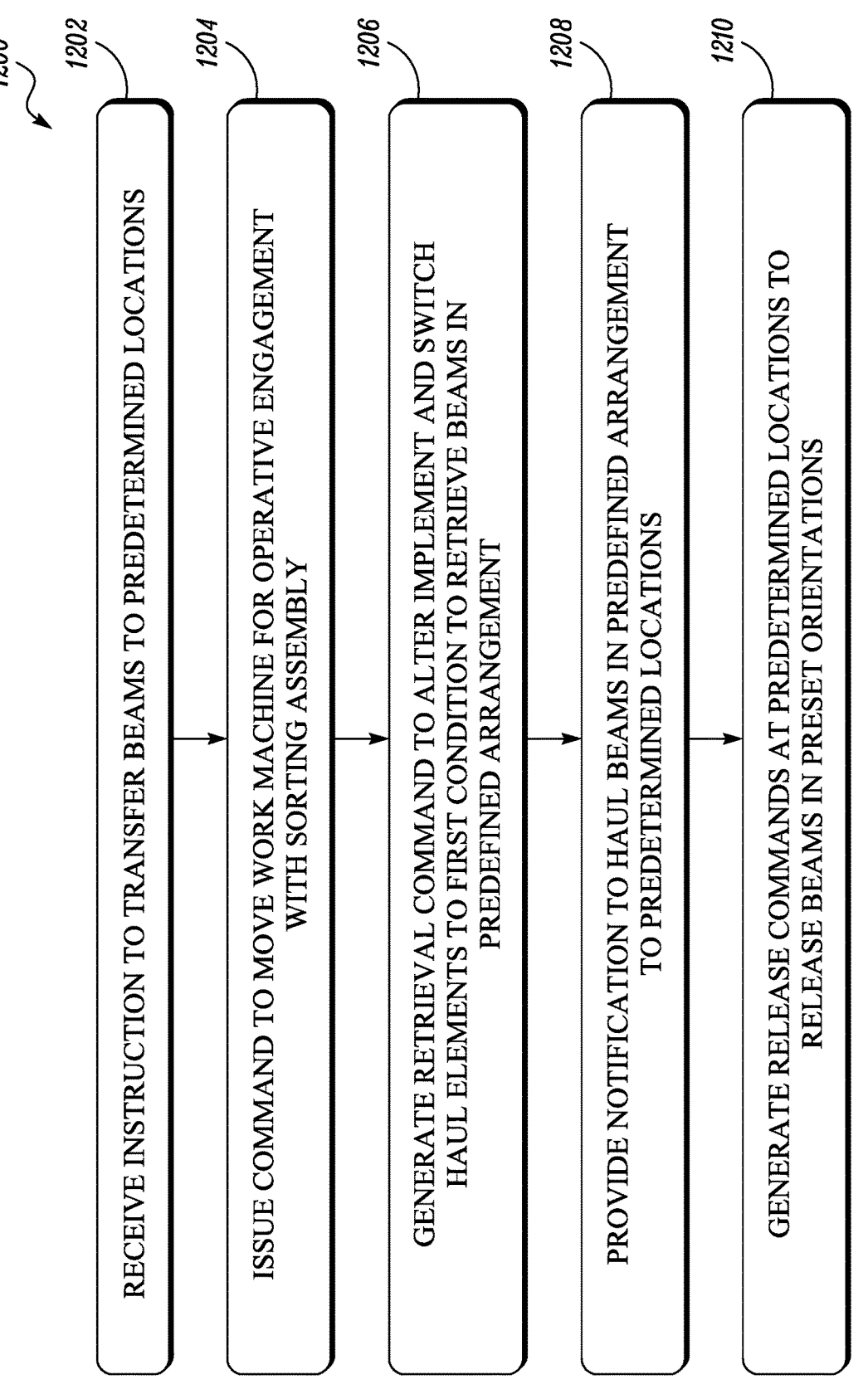

*1200*

*1202*

RECEIVE INSTRUCTION TO TRANSFER BEAMS TO PREDETERMINED LOCATIONS

*1204*

ISSUE COMMAND TO MOVE WORK MACHINE FOR OPERATIVE ENGAGEMENT WITH SORTING ASSEMBLY

*1206*

GENERATE RETRIEVAL COMMAND TO ALTER IMPLEMENT AND SWITCH HAUL ELEMENTS TO FIRST CONDITION TO RETRIEVE BEAMS IN PREDEFINED ARRANGEMENT

*1208*

PROVIDE NOTIFICATION TO HAUL BEAMS IN PREDEFINED ARRANGEMENT TO PREDETERMINED LOCATIONS

*1210*

GENERATE RELEASE COMMANDS AT PREDETERMINED LOCATIONS TO RELEASE BEAMS IN PRESET ORIENTATIONS

*FIG. 12*

SYSTEM AND METHOD FOR DELIVERING BEAMS TO PREDETERMINED LOCATIONS OF WORK SITES

TECHNICAL FIELD

The present disclosure relates to delivering beams to predetermined locations of a work site. More particularly, the present disclosure relates to a system and method for delivering beams to the predetermined locations of the work site, at least in part, by using autonomous or semi-autonomous machines.

BACKGROUND

A work site, such as a solar farm, often requires large quantities of materials or components, such as torsion bars, beams, and/or the like (e.g., to support solar panels) to be delivered to various designated or predetermined locations of the work site. While devices, such as the solar panels, may be delivered in crates, components, such as, beams may be delivered in loose batches to the predetermined locations by one or more supply machines. Once a supply machine reaches a designated or a predetermined location, workers are typically required to manually unload the beams from the supply machine and place them at the predetermined locations in a desired orientation. Such conventional methods for delivering such components at those locations are time-consuming and labor-intensive.

SUMMARY OF THE INVENTION

In one aspect, the disclosure is directed towards a system for delivering one or more beams to one or more predetermined locations of a work site. The system includes a sorting assembly, a work machine, and a control system. The sorting assembly is configured to receive the beams in loose batches and arrange the beams in a predefined arrangement. The work machine includes an implement having one or more haul elements mounted thereto. The control system is configured to receive an instruction to transfer the beams to the predetermined locations and issue a command to move the work machine for operative engagement with the sorting assembly in response to the instruction. Further, the control system is configured to generate a retrieval command to alter the implement and switch the haul elements to a first condition to retrieve the beams from the sorting assembly in the predefined arrangement. Also, the control system is configured to provide a notification to haul the beams in the predefined arrangement to the predetermined locations. The control system generates release commands correspondingly at the predetermined locations such that at least one haul element switches from the first condition to a second condition to release at least one beam correspondingly at the predetermined locations in a preset orientation.

In another aspect, the disclosure relates to a method for delivering one or more beams to one or more predetermined locations of a work site. The method includes receiving an instruction to transfer the beams to the predetermined locations and issuing a command to move a work machine for operative engagement with a sorting assembly in response to the instruction. The sorting assembly receives the beams in loose batches and arranges the beams in a predefined arrangement. The work machine includes an implement having haul elements mounted thereto. The method further includes generating a retrieval command to alter the implement and switch the haul elements to a first condition to retrieve the beams from the sorting assembly in the predefined arrangement. Further, the method includes providing a notification to haul the beams in the predefined arrangement to the predetermined locations. The method additionally includes generating release commands correspondingly at the predetermined locations such that at least one haul element switches from the first condition to a second condition to release at least one beam correspondingly at the predetermined locations in a preset orientation.

BRIEF DESCRIPTION OF THE DRAWINGS

FIG. 12 is a flowchart illustrating an example method for delivering the beams to one or more predetermined locations of the work site, in accordance with an embodiment of the present disclosure.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

Figure 1:
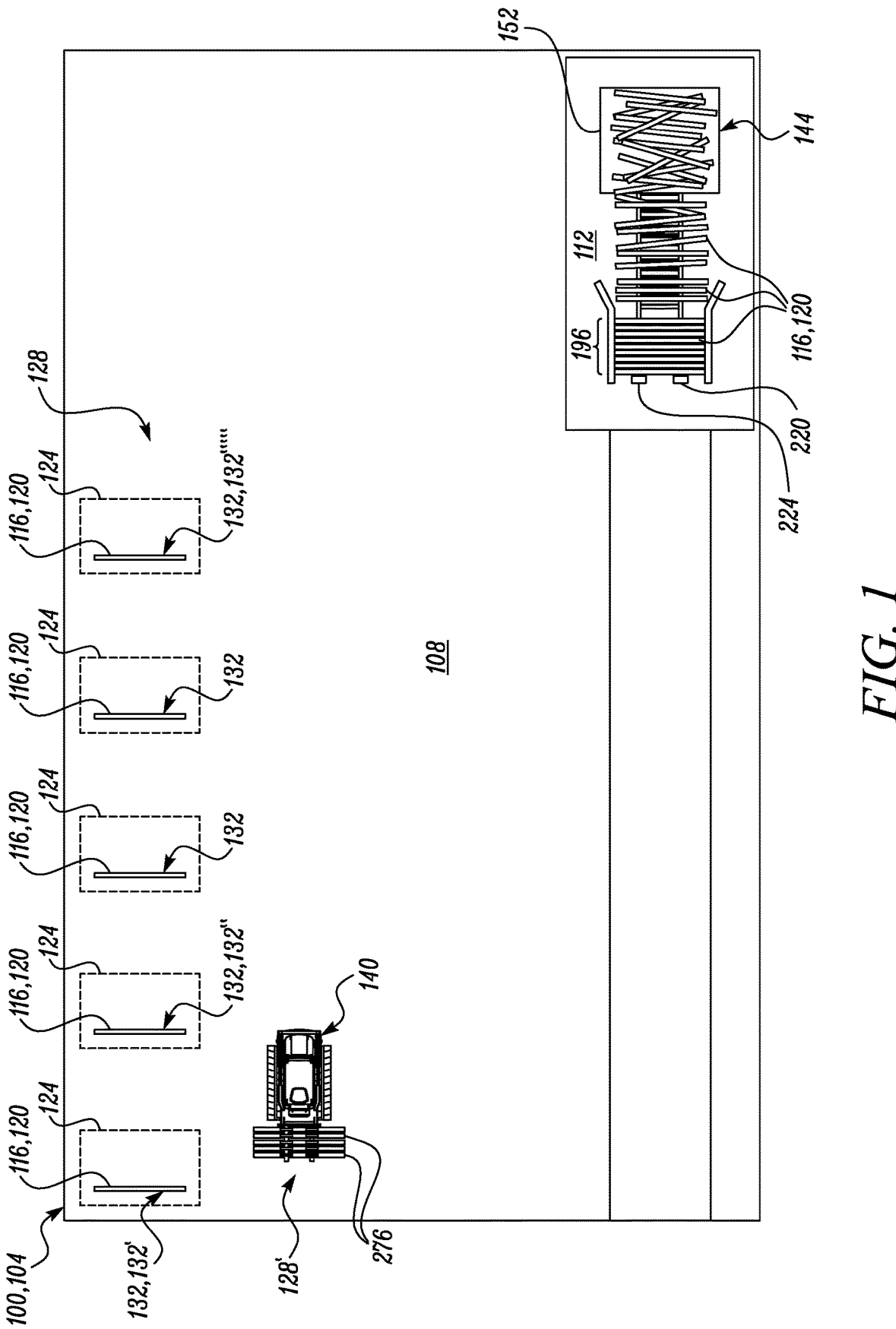
FIG. 1 is a plan view of an example work site and a system for delivering beams to predetermined locations of the work site, in accordance with an embodiment of the present disclosure.

Referring to FIG. 1, an example work site (see work site 100) is shown. Although not limited, the work site 100 may be a construction site. In one example, the work site 100 may be a construction site for the construction of a solar farm 104, and one or more segments of a construction process for building the solar farm 104 will be discussed, by example, in the present disclosure. Without limitation, however, various other applications of the work site 100 may be contemplated by someone skilled in the art, based on the present disclosure. The work site 100 may include a construction area 108 and a storage area 112.

With continued reference to FIG. 1., the storage area 112 (also referred to as a storage facility or a staging area) of the work site 100 may include or correspond to a region of the work site 100 where materials 116 applicable for the installation of solar panels (not shown) and/or for the construction of the solar farm 104 may be gathered and stored. As depicted in FIG. 1, the materials 116 may include beams 120. However, the materials 116 may correspond to and/or include, but are not limited to, beams, torsion bars, rods, columns, channels, fastening systems, solar panels, electrical/electronic devices, wires, cablings, clamps, and the like materials, all or most of which may be needed for the construction and/or maintenance of the solar farm 104. Other apparatuses and/or systems may be present at the storage area 112, as well, as shall be understood from the description set out further below. Out of the materials 116 listed above, aspects related to the beams 120 are discussed throughout the present disclosure and are depicted in the figures (not all beams 120 are marked in FIGS. 1, 8, and 9 for clarity). Discussions corresponding to the beams 120 may be suitably applied to one or more of the other materials 116, e.g., similar materials, such as rods, tubes, columns, as may be available at the storage area 112, at any given point.

As shown in FIG. 1, in some embodiments, the construction area 108 may adjoin the storage area 112. The construction area 108 may receive a supply of the materials 116 from the storage area 112 for the installation of the solar panels and/or for the construction of the solar farm 104 at the construction area 108. The sites of the construction area 108 at which the solar panels may be installed may be referred to as 'solar panel sites 124'. Solar panel sites 124 may correspondingly define predetermined locations 132 at which the materials 116 (e.g., the beams 120) may be respectively delivered and/or deposited, such that by use of the materials 116, the solar panels may be correspondingly installed at the solar panel sites 124. Although not limited, the solar panel sites 124 (and thus the solar panels at those sites) in the construction area 108 may be laid out according to a grid pattern, i.e., in rows and/or columns. Various other layout patterns for the solar panel sites 124 and thus the solar panels, such as a rotational pattern, a polygonal pattern, an oblong pattern, a linear pattern, an irregular pattern, and other patterns, may be contemplated.

An aspect of the present disclosure discusses, an autonomous or semi-autonomous system and manner of delivery of the beams 120 to the predetermined locations 132 (e.g., one beam 120 per one predetermined location 132). In this regard, and as an example view provided in FIG. 1, beams 120 are shown to be deposited at the predetermined locations 132 in corresponding solar panel sites 124 in the construction area 108—the deposition being executed by an autonomous or semi-autonomous beams delivery system and/or process. In some embodiments, the beams 120 may be deposited in the construction area 108 in rows that may comply with the example grid pattern of the solar panel sites 124, described above. For example, the beams 120 in the predetermined locations 132 of the solar panel sites 124 of FIG. 1 (which may correspond to the beams 120 in FIG. 4) may be collectively referred to as a first beam row 128, and, understandably, the construction area 108 may include one or more other beam rows 128', as well.

Figure 11A:
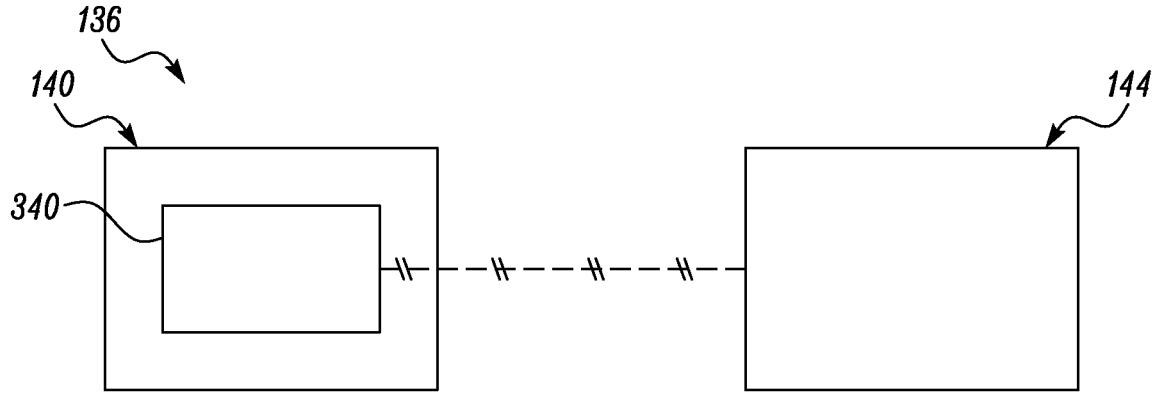
FIGS. 11A-C are block diagrams of example systems for delivering beams to a predetermined location of the work site.
Figure 11B:
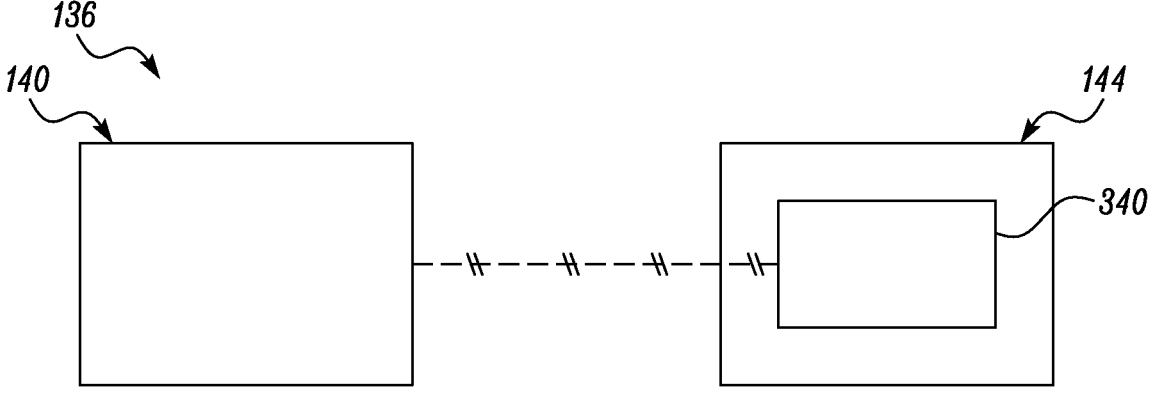
Figure 11C:
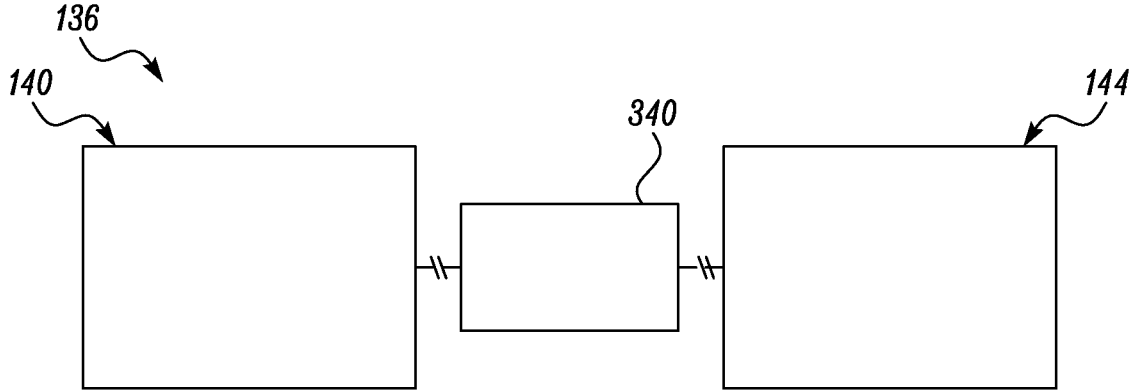

The beams 120, as such, may include, but are not limited to, I-beams and/or H-beams. Although not limited, the beams 120 may include a linear profile and may be formed, at least in part, from a metallic material. Further, the beams 120 may all be congruous and/or identical to each other—for example, the beams 120 may be equal in shape and dimension to each other, although variations in the shape and size of the beams 120 may be contemplated by someone of skill in the art based on the present disclosure. With regard to the transfer of the beams 120 (e.g., the autonomous or semi-autonomous beams delivery system and/or process) to the predetermined locations 132, an example aspect of the present disclosure describes a system 136 (see FIGS. 11A-C) for delivering the beams 120 to the predetermined locations 132 of the work site 100. The system 136 includes a work machine 140, a sorting assembly 144, and a control system 340 in operable communication with the work machine 140 and the sorting assembly 144. As shown in FIGS. 11A-C, different, non-limiting, embodiments of the system 136 are disclosed, and each of those embodiments are annotated by the same reference numeral, i.e., '136', for ease in reference. These embodiments are described later in the present disclosure.

Figure 6:
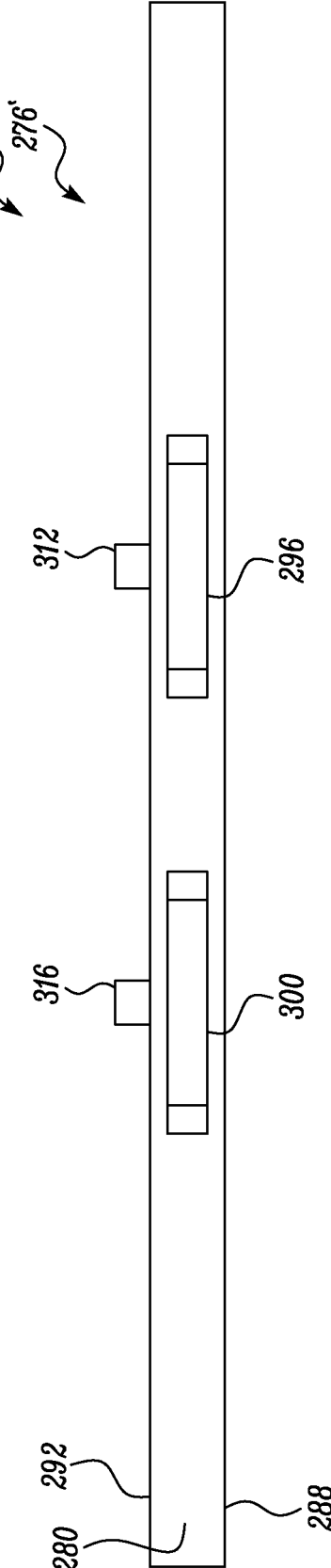
FIG. 6 is a top view of the single haul element of FIG. 5, in accordance with an embodiment of the present disclosure.
Figure 7:
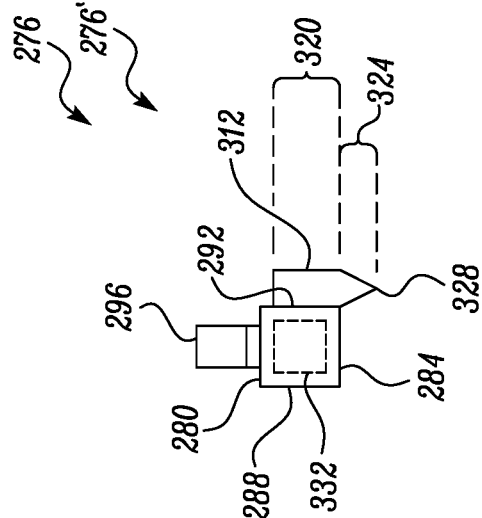
FIG. 7 is a side view of the single haul element of FIG. 5, in accordance with an embodiment of the present disclosure.
Figure 8:
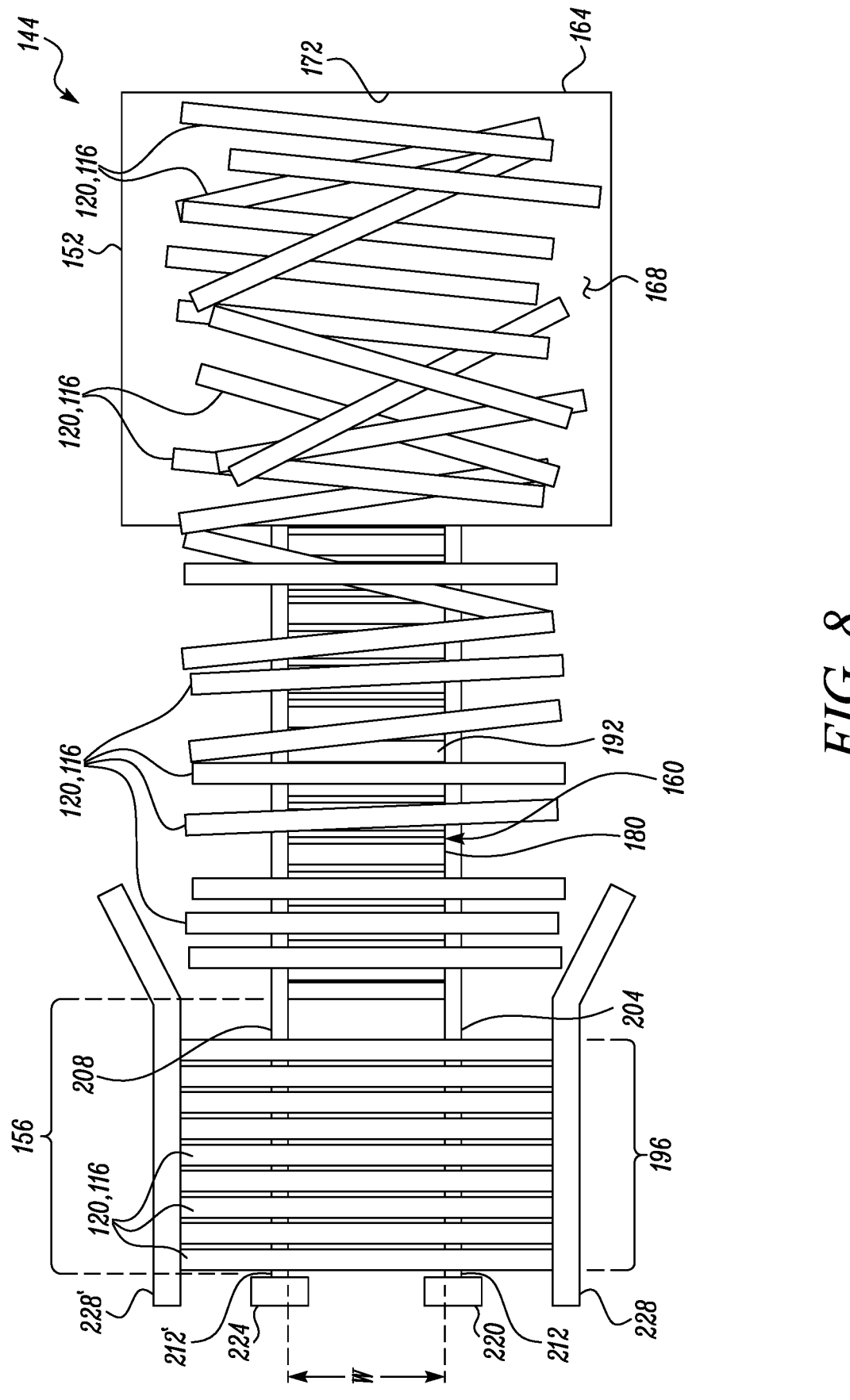
FIG. 8 is a top view of a sorting assembly, in accordance with an embodiment of the present disclosure.

Referring to FIG. 8, and also in conjunction with FIGS. 1, 5, 6, and 7, the sorting assembly 144 is described. The sorting assembly 144 is configured to receive the beams 120 in loose batches (e.g., from another machine or device) (not shown) and arrange and/or sort the beams 120 in a predefined arrangement 196. The predefined arrangement 196, as referred to in the present disclosure, may not necessarily correspond or relate to the number of beams 120. Rather, the predefined arrangement 196 of the beams 120 may correspond to an arrangement of the beams 120, at any given point, in which the beams 120 may be positioned one after the other, e.g., in a serial fashion such that a longitudinal side face 148 of one beam 120 (or each beam 120) (see FIGS. 4 and 9) may face or be directed towards a longitudinal side face 148 of another beam 120 (or an adjacent beam 120). The sorting assembly 144 may include a receptacle 152, a stacking platform 156, and a conveyor 160, as shown. Although not limited, the sorting assembly 144, as a whole, may be provided at the storage area 112 (see FIG. 1).

The receptacle 152 may include or correspond to a container, and in some examples, may be in the form of a hopper 164. The receptacle 152 may include a cavity 168 defining a first opening 172 and a second opening 176. Beams 120 in loose batches may be introduced (e.g., by any suitable method) into the cavity 168 through the first opening 172 such that the sorting assembly 144 may receive the beams 120. The receptacle 152 may hold (or store) the beams 120 in loose batches therewithin. Further, the receptacle 152 may release the beams 120 out of the cavity 168 through the second opening 176. As an example, a release of the beams 120 from the cavity 168 through the second opening 176 may be attained under the action of gravity. Further, as an example, a release of a number of beams 120 from the receptacle 152 through the second opening 176 may be suitably controlled and/or regulated, e.g., by use of a gate or a door (not shown) that may selectively open and close the second opening 176.

The conveyor 160 may include an endless belt 180. The endless belt 180 may operably extend from the receptacle 152 all the way to the stacking platform 156. The endless belt 180 may receive the beams 120, e.g., loosely, from the receptacle 152, may support the beams 120, and may move, e.g., with respect to a conveyor frame 122, to convey the beams 120 (from the point of its receipt on the endless belt 180) to the stacking platform 156. As an example, a portion of the conveyor 160 and/or the endless belt 180 may be disposed under the second opening 176 of the receptacle 152 such that the endless belt 180 may receive an efflux of the beams 120 (e.g., under the action of gravity) from the receptacle 152, through the second opening 176.

Figure 9:
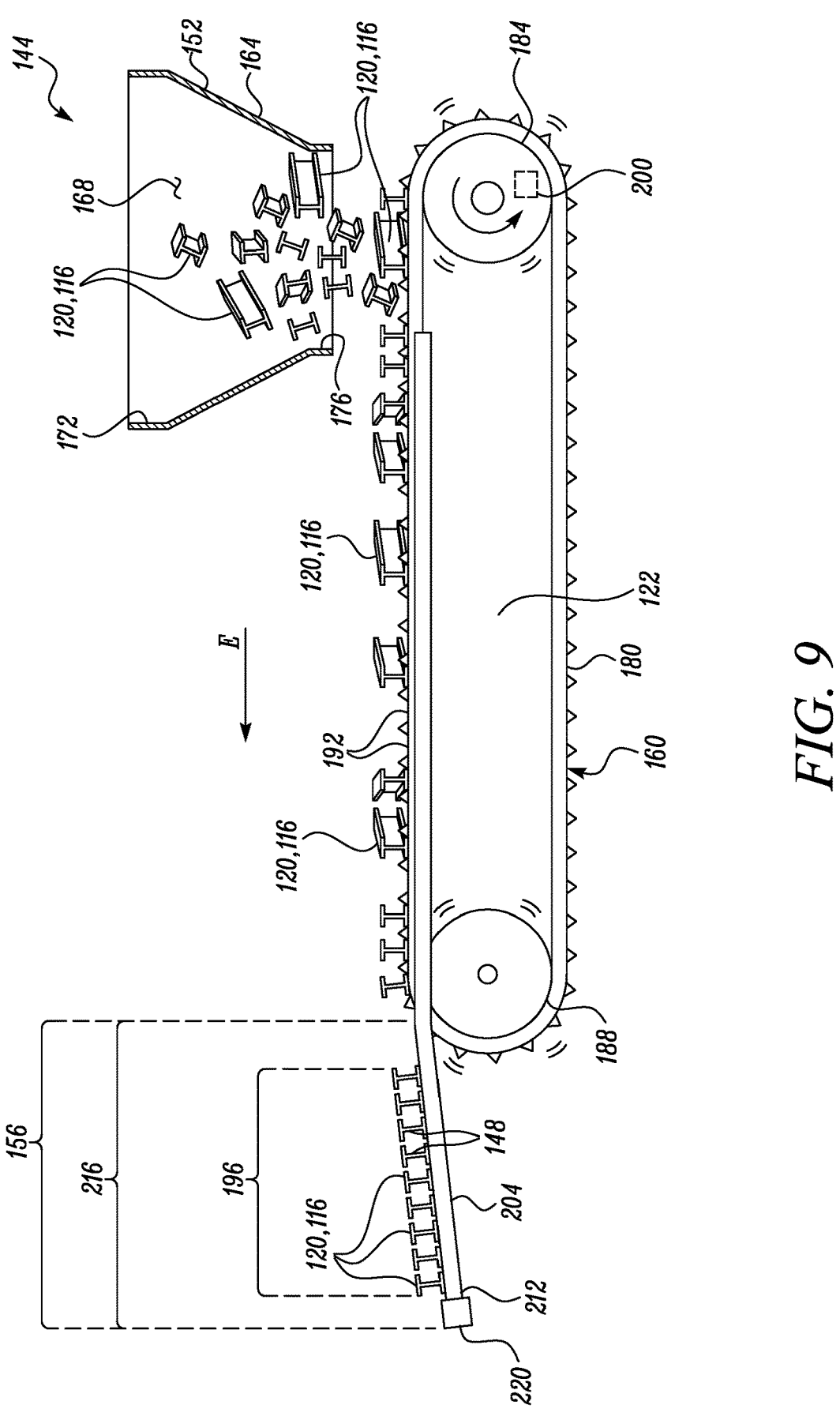
FIG. 9 is a side view of the sorting assembly of FIG. 8, in accordance with an embodiment of the present disclosure.

Referring to FIG. 9, and in some embodiments, the conveyor 160 may include a driver pulley 184 and a driven pulley 188. The driver pulley 184 and the driven pulley 188 may be spaced apart from each other. The endless belt 180 may be operably wound and supported around each of the driver pulley 184 and the driven pulley 188 and may be sufficiently tensioned therebetween. In so doing, a rotation of the driver pulley 184 (e.g., by using electrical actuation) may cause the endless belt 180 to move or rotate with the rotation of the driver pulley 184, in turn also causing the driven pulley 188 to rotate (e.g., synchronously) with the rotation of the driver pulley 184.

In some embodiments, the endless belt 180 may define a number of grooves 192. The grooves 192 may be serially arranged one after the other and in regular intervals along a travel path, E, movable by the endless belt 180 from the receptacle 152 to the stacking platform 156. As an example, the grooves 192 may extend along a width, W, of the endless belt 180 (see FIG. 8). The grooves 192 may be configured to correspondingly receive and accommodate the beams 120, at least partially, therewithin, and guide the beams 120 toward the stacking platform 156 and/or the predefined arrangement 196 as the conveyor 160 urges (a section of) the endless belt 180 towards the stacking platform 156. In one example, one beam 120 may be accommodated in one groove 192. In some embodiments, the beams 120 may be accommodated within the grooves 192 such that they can, at least partly, span across the width, W, of the endless belt 180.

In some embodiments, the conveyor 160 may include a vibratory unit 200 (see FIG. 9). The vibratory unit 200 may impart vibration to the endless belt 180 to urge the beams 120 to correspondingly settle and be accommodated into the grooves 192. The vibratory unit 200 may be located within or adjacent to one or more of the driver pulley 184 and/or driven pulley 188 and/or the conveyor frame 122 such that a vibration (or a shaking motion) may be imparted to the endless belt 180. A working and a functional association of the vibratory unit 200 with the conveyor 160 to impart vibration to the conveyor 160 may be contemplated by someone of skill in the art, and thus will not be discussed in the present disclosure.

The stacking platform 156 may be used to accumulate and stack the beams 120. In this regard, the stacking platform 156 may include one or more rails (e.g., see first rail 204 and second rail 208 in FIG. 8) (also see FIG. 9). As may be understood, the second rail 208 may be hidden behind the first rail 204 in the illustration of the sorting assembly 144 in FIG. 9, but the same can be viewable in FIG. 8). Both the first rail 204 and the second rail 208 may be positioned or disposed relatively close to the endless belt 180, such that the beams 120 may exit the endless belt 180 and be delivered onto the first rail 204 and the second rail 208 at an end of the travel path, E. In this regard, as the beams 120 may move in a direction away from the receptacle 152 and approach the stacking platform 156, the beams 120 may disembark or alight from the endless belt 180 and may be pushed onto the first rail 204 and the second rail 208. In some embodiments, the first rail 204 and the second rail 208 (or portions of the first rail 204 and the second rail 208) may be positioned lower in elevation to the endless belt 180 such that a deboarding of the beams 120 from the endless belt 180 and a subsequent boarding of the beams 120 onto each of the first rail 204 and the second rail 208 may be relatively easily attained.

Although not limited, both the first rail 204 and the second rail 208 may be positioned at the same elevation with respect to the endless belt 180 or the conveyor 160. In so doing, the first rail 204 and the second rail 208, when receiving the beams 120, may also help stabilize the beams 120 on the stacking platform 156. In some embodiments, the first rail 204 may define an end 212 disposed towards the stacking platform 156 and relatively away from the endless belt 180, as shown. A portion 216 of the first rail 204 (and the second rail 208) defining the end 212 (and the end 212'), extending beyond the endless belt 180, may wholly or partly form the stacking platform 156. In some embodiments, the portion 216 may be tilted at an angle to an extension or a plane of the endless belt 180 such that the end 212 may be positioned lower in elevation to a point at which the beams 120 may exit the conveyor 160 and be pushed onto the first rail 204 (and the second rail 208). Also, the tilting of the portion 216 may be exaggerated in FIG. 9 for ease in understanding. Description corresponding to the first rail 204 may be suitably comported to the second rail 208, as well, as applicable.

An angle at which each of the first rail 204 and the second rail 208 may be tiled or angled (e.g., with respect to the extension of the endless belt 180 or the horizontal) may be the same. Such titled or angular positioning of the portions (e.g., portion 216) of first rail 204 (and the second rail 208) may ensure that the beams 120 onboard the first rail 204 and second rail 208 may, freely or without external support, slide and advance under the action of gravity towards the ends 212, 212' associated with the first rail 204 and the second rail 208, and thus may accumulate and stack up one behind the other at said ends 212, 212' in the predefined arrangement 196. In some embodiments, the stacking of the beams 120 at the ends 212, 212' may be attained as the beams 120 trailing on the endless belt 180 may push the beams 120 leading on the stacking platform 156.

In some embodiments, the stacking platform 156 may include one or more stoppers—e.g., see first stopper 220 and second stopper 224. The first stopper 220 and second stopper 224 may be respectively positioned at the ends 212, 212' of the first rail 204 and the second rail 208 and may be applied to limit the slide or advancement of the beams 120 beyond the ends 212, 212' of the first rail 204 and the second rail 208. In some embodiments, the stacking platform 156 also includes walls 228, 228, which may be positioned laterally oppositely to each other, as shown in FIG. 8, so as to restrict a lateral displacement (or misplacement) of the beams 120 as the beams 120 slide along the portions (e.g., portion 216) of first rail 204 (and the second rail 208).

Figure 2:
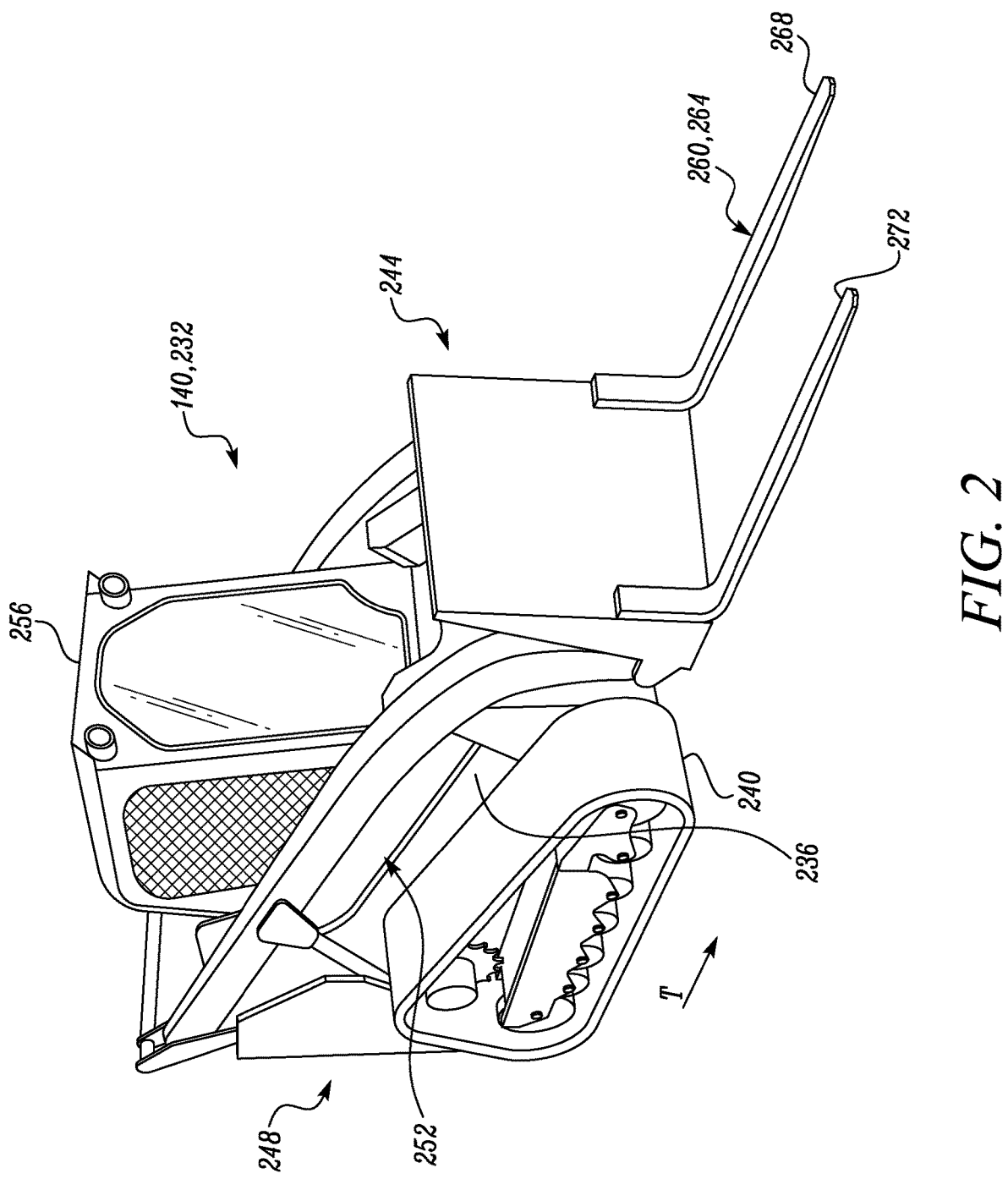
FIG. 2 is a perspective view of an example work machine having an implement, in accordance with an embodiment of the present disclosure.
Figure 3:
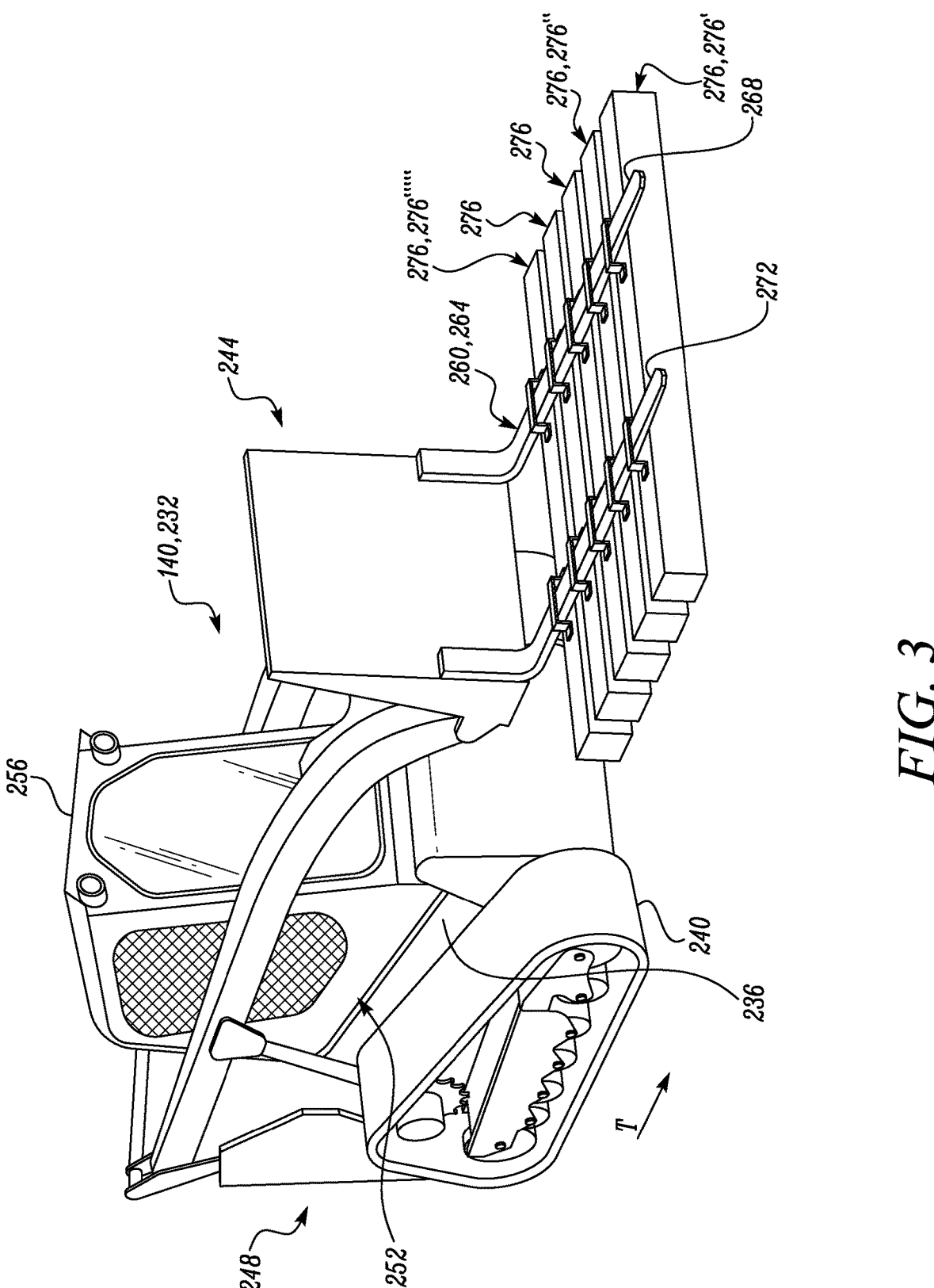
FIG. 3 is another perspective view of the work machine having one or more haul elements mounted onto the implement, in accordance with an embodiment of the present disclosure.
Figure 4:
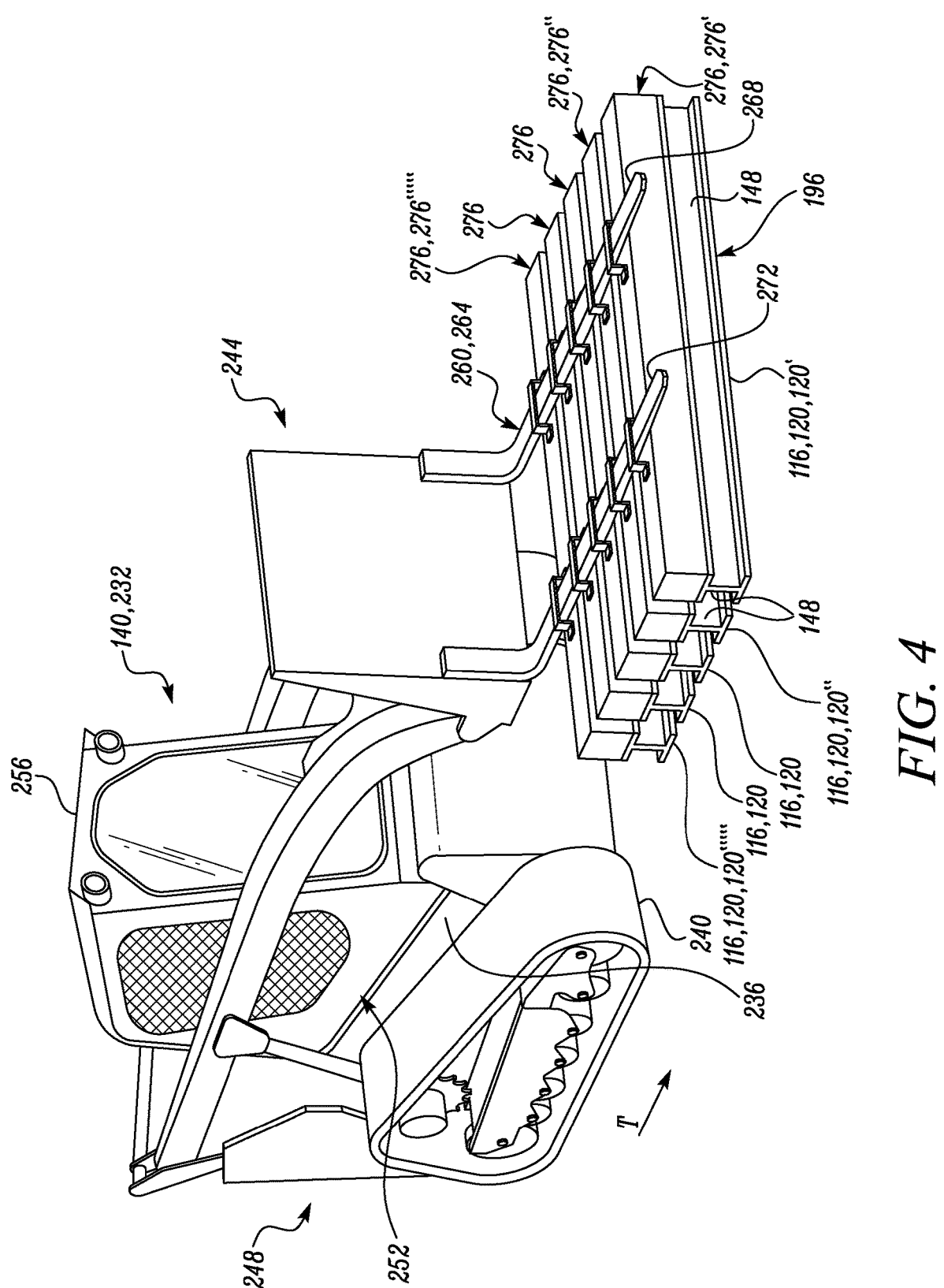
FIG. 4 is yet another perspective view of the work machine illustrating beams grasped and retained by the haul elements, in accordance with an embodiment of the present disclosure.

Referring to FIGS. 2, 3, and 4, the work machine 140 will be now described. The work machine 140 may include a compact track loader 232, although other machine types may be contemplated based on the present disclosure. The work machine 140 may be employed to deliver the beams 120 from the sorting assembly 144 (or the storage area 112) to the construction area 108 or to the predetermined locations 132 of the construction area 108. As an example, delivering the beams 120 may mean loading the beams 120 onto the work machine 140, carrying the beams 120 correspondingly up to the predetermined locations 132, and unloading/depositing the beams 120 correspondingly at the predetermined locations 132, such that at least one beam 120 is made available at one predetermined location 132. More particularly, aspects of the present disclosure may correspond to the segment of the construction process in which one beam 120 is delivered per predetermined location 132. The work machine 140 may correspond to various other work machines, such as, a compact wheel loader, a multi-terrain loader, and/or the like machine, that may perform the function of the work machine 140, as is described in the present disclosure. Therefore, references to the compact track loader 232 are by example only.

The work machine 140 may include a chassis or a frame 236. Further, the work machine 140 may include one or more traction devices 240 supported by the frame 236. As an example, the traction devices 240 may include crawlers or endless tracks, although the traction devices 240 may also include wheels, provided either alone or in combination with the crawlers. The work machine 140 may define a front end 244 and a back end 248. The terms 'front' and 'back', as used herein, are in relation to an example direction of travel of the work machine 140, and the same is illustratively represented by an arrow, T, in FIG. 2, with said direction of travel being defined from the back end 248 towards the front end 244.

The work machine 140, when moving in the direction, T, defined from the back end 248 towards the front end 244, may be referred to as a condition in which the work machine 140 moves or travels in a 'forward direction'. Conversely, the work machine 140, when moving oppositely to the direction, T, defined from the front end 244 towards the back end 248, may be referred to as a condition in which the work machine 140 moves or travels in a 'reverse direction'. A movement of the traction devices 240, in either the forward direction or the reverse direction, may be powered by a power source 242, such as an engine and/or an electric motor (see FIG. 10), housed within a power compartment 252 (see FIGS. 2 through 4) of the work machine 140. Also, the work machine 140 may include an operator cab 256 to house various controls of the power source 242 and/or an implement 260 of the work machine 140. Apart from the power source 242, the work machine 140 may also include a number of sub-systems 246 (see FIG. 10) that may assist with machine movement and/or a machine navigation at the work site 100, such as a braking system, a steering system, a safety system (e.g., including an obstacle detection system), etc.

The implement 260 may be movable with respect to the frame 236. In some embodiments, the implement 260 corresponds to or includes a forklift device 264, which may be generally applicable to carry apparatuses, such as pallets, e.g., inside a shopfloor. The forklift device 264 may include one or more forks, e.g., a first fork 268 and a second fork 272, as shown. Also, the forklift device 264 (e.g., the first fork 268 and the second fork 272) may be raisable and lowerable with respect to the frame 236, for example, by way of an activation of an actuation system 238 (e.g., a hydraulic actuation system) (see FIG. 10) of the work machine 140. According to an aspect of the present disclosure, the implement 260 may be applied when moving the beams 120 to the predetermined locations 132 of the construction area 108 of the work site 100, as will be understood from the description further below.

The work machine 140 may include one or more haul elements 276 mountable onto the implement 260 (see FIGS. 3 and 4) (not all haul elements 276 may be marked in the figures for clarity). In other words, the haul elements 276 may be mounted onto the first fork 268 and the second fork 272 of the implement 260. As an example illustration in FIGS. 3 and 4, five (5) haul elements 276 are (combinedly) mounted sequentially, one after the other, to the first fork 268 and the second fork 272. A higher or a lower number of haul elements 276 may be mounted to the first fork 268 and the second fork 272, and thus the number five (5) is provided only for illustrative purposes. A first haul element 276' may be positioned farthest from the frame 236, while a fifth or last haul element 276'''' may be disposed closest to the frame 236.

The haul elements 276 may be used or applied to pick the beams 120 from the stacking platform 156 of the sorting assembly 144 (in the predefined arrangement 196) and transport the beams 120 to the predetermined locations 132 of the construction area 108 of the work site 100. As an example, one beam 120 may be grasped by one haul element 276. Therefore, if five (5) haul elements 276 are mounted to the forklift device 264 (or to the first fork 268 and the second fork 272 of the implement 260), a maximum of five (5) beams 120 may be grasped by the haul elements 276 and transported from the sorting assembly 144 to corresponding five (5) predetermined locations 132 of the construction area 108 in a single delivery cycle. As an example, see a first beam 120' being grasped by the first haul element 276' and a fifth or last beam 120'''' being grasped by the fifth or last haul element 276''''. Description further below includes some structural discussions corresponding to the first haul element 276'. Such discussions may be suitably applied to all other haul elements 276.

Figure 5:
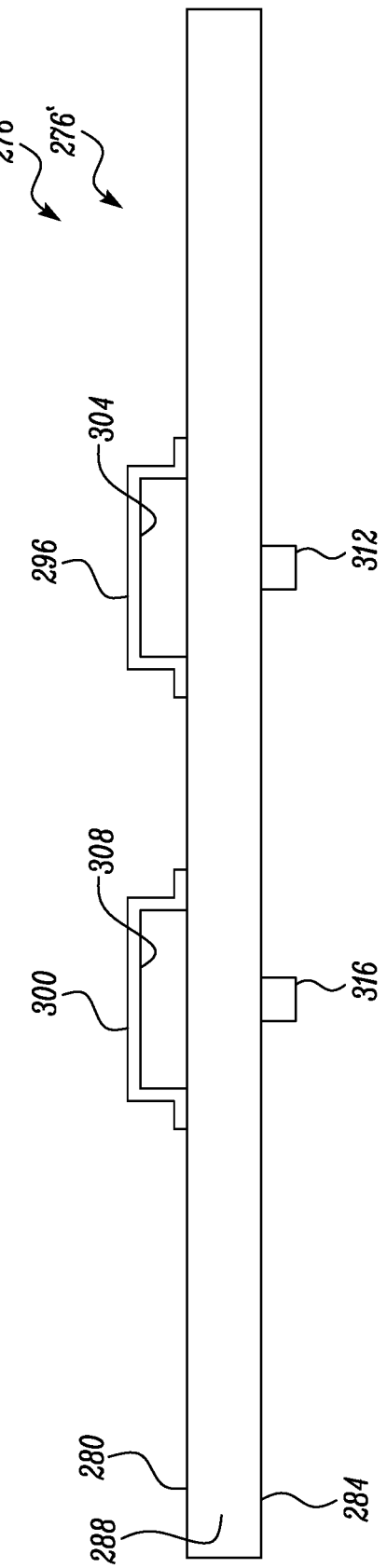
FIG. 5 is a front view of a single haul element, in accordance with an embodiment of the present disclosure.

Referring to FIGS. 5, 6, and 7, the first haul element 276' may include an elongated profile. Further, the first haul element 276' may define an upper surface 280, a lower surface 284, a first side surface 288, and a second side surface 292, as shown. The first haul element 276' may include one or more engaging portions for correspondingly engaging with the forklift device 264. As an example, the engaging portions include or correspond to a first engaging portion 296 and a second engaging portion 300. The first engaging portion 296 and the second engaging portion 300 may define corresponding apertures—e.g., a first aperture 304 and a second aperture 308 through which the first fork 268 and the second fork 272 of the implement 260 can correspondingly pass through. In so doing, effectively, the first engaging portion 296 and the second engaging portion 300 of the first haul element 276' correspondingly engage with the first fork 268 and the second fork 272 of the first haul element 276'.

Further, the first haul element 276' includes one or more separator blocks—e.g., a first separator block 312 and a second separator block 316. The first separator block 312 and the second separator block 316 may be applied to space out and maintain a clearance (e.g., a constant clearance) between one haul element (e.g., the first haul element 276') and an adjacent haul element (e.g., a second haul element 276) (see FIGS. 3 and 4). The separator blocks may also help maintain a clearance between the beams 120 held by the haul elements 276 (e.g., adjacent haul elements 276), at any given point. To this end, the first separator block 312 and the second separator block 316 may be each positioned at the second side surface 292 of the first haul element 276'. As shown in FIG. 7, the first separator block 312 may include a stub portion 320 and a tapered portion 324 extending from the stub portion 320. The tapered portion 324 defines a tip 328 and may define a body with a tapering profile extending till the tip 328. An extension of the tapered portion 324 towards the tip 328 may be aligned in a direction that extends from the upper surface 280 of the first haul element 276' towards the lower surface 284 of the first haul element 276'. At least a part of the tapered portion 324, along with the tip 328, may extend outwards and/or beyond a plane of the lower surface 284 of the first haul element 276'. Similar discussion may be contemplated for the second separator block 316.

In some embodiments, as the beams 120 may be made from a metallic material, magnetic action may be used to couple the beams 120 to the haul elements 276. In this regard, the first haul element 276' may include an electromagnet 332 (see FIG. 7) to respectively attract, grasp, and retain at least one beam 120 (e.g., one corresponding beam, see beam 120', FIG. 4), thereto. As an example, the electromagnet 332 may be switchable between various conditions—e.g., a first condition and a second condition. The first condition may correspond to an active condition of the electromagnet 332 and in which the first haul element 276' may be able to attract and couple a corresponding beam (e.g., beam 120') thereto. The second condition may correspond to an inactive condition of the electromagnet 332 and in which the first haul element 276' may be able to decouple and/or dislodge the corresponding beam (e.g., beam 120') therefrom.

The work machine 140 may further include a sensor system 336 (FIG. 10) having a variety of sensors to detect one or more machine parameters. As an example, the sensor system 336 may include one or more of each of a machine speed sensor to sense a ground speed of the work machine 140; an accelerometer or an inertial measurement unit (IMU) sensor to sense an acceleration/orientation of the work machine 140 and/or the implement 260; location sensors (e.g., a Global Positioning System (GPS), a Global Navigation Satellite System (GNSS), or any other location tracking system) to detect a location of the work machine 140; an obstacle sensor to detect an obstacle in a moving path of the work machine 140; a set of imaging or visual sensors, such as 3d (dimensional) sensors, LIDAR (Light Detection and Ranging) sensors, image/video capturing devices (such as cameras), and the like sensors, to detect the surroundings of the work machine 140; and one or more pressure sensors to detect a load on the implement 260. Such sensors may be disposed on various, appropriate parts of the work machine 140 to sense one or more of the above noted parameters associated with the work machine 140. The sensors are well known in the art and hence, not described in greater detail for the sake of brevity of the present disclosure.

Figure 10:
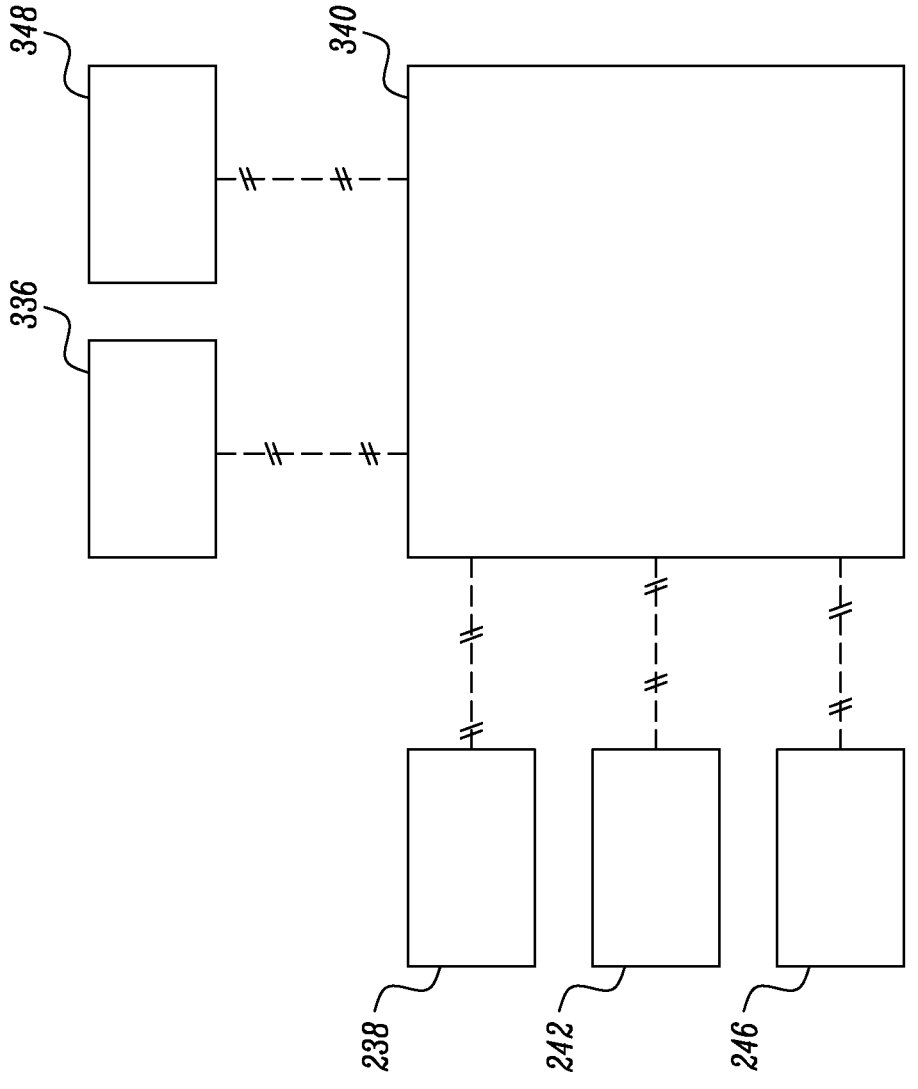
FIG. 10 is a schematic view of an example control system in connection with systems and sub-systems of the work machine of FIGS. 2 through 4 and the sorting assembly of FIGS. 8 and 9, in accordance with an embodiment of the present disclosure.

Referring to FIG. 10, the system 136 may include the control system 340 for attaining an autonomous or a semi-autonomous functioning of the work machine 140, enabling the work machine 140 to transfer the beams 120 to the predetermined locations 132 of the construction area 108 of the work site 100. To this end, the control system 340 may correspond to a main or a single controller, which may be operably coupled (e.g., through a wired connection or wirelessly) to various systems or sub-systems (e.g., sub-systems 246) of the work machine 140 and to various units or sub-units (e.g., the vibratory unit 200) of the sorting assembly 144, described above, such that it can control the working of one or more of the work machine 140 and the sorting assembly 144. For example, systems or sub-systems of the work machine 140 may include, but are not limited to, the actuation system 238, the power source 242, and other sub-systems 246, as shown in FIG. 10.

The control system 340 may include one or more processing units configured to process data received from the systems or sub-systems associated with the work machine 140 and/or from the units or sub-units associated with the sorting assembly 144. The control system 340 may convert said data into formats readable by one or more other systems or sub-systems associated with the work machine 140 and/or units or sub-units associated with the sorting assembly 144 such that those systems and/or units can take relevant/corrective action in pursuance to the detection of any work machine condition.

The control system 340 may also be in operable communication (e.g., through a wired connection or wirelessly) with an input device, such as a joystick, touchscreen, associated with the work machine 140 (e.g., those that may be provided within the operator cab 256 of the work machine 140 or those that may be provided outside or away from the work machine 140 from where an instruction for executing various work machine procedures or sorting assembly procedures may be received. As an example, the instruction may be initiated by an operator stationed within the operator cab 256 or stationed remotely to the work machine 140. As an example, the instruction may correspond to the transfer of the beams 120 from the storage area 112 or from the sorting assembly 144 to the predetermined locations 132. To effectuate such transfer of the beams 120, the control system 340 may also be in operative communication with various other systems and/or devices of the work machine 140, such as the power source 242 of the work machine 140 and the sub-systems 246 of the work machine 140 so as to suitably control those systems to maneuver the work machine 140 when transporting the beams 120.

Further, the control system 340 may be in communication (e.g., through a wired connection or wirelessly) with a memory 348. As some non-limiting examples, the memory 348 may be located within one of the control system 340, the work machine 140, or the sorting assembly 144, or may be located remote to one or more of these. As some further non-limiting examples, the memory 348 may include multiple individual data storage devices, e.g., three (3) data storage devices, with such data storage devices being correspondingly located within the control system 340, the work machine 140, and the sorting assembly 144. As an example, the memory 348 may store a set of instructions that the control system 340 may retrieve in response to the receipt of the instructions. The control system 340 may be configured to execute the set of instructions retrieved from the memory 348 to perform various steps associated with a particular procedure—e.g., the steps associated with the transfer of the beams 120 from the storage area 112 (or from the sorting assembly 144) to the predetermined locations 132 of the construction area 108 of the work site 100.

The control system 340 may also be in operative communication (e.g., through a wired connection or wirelessly) with the electromagnet 332 (e.g., all electromagnets 332 associated with the haul elements 276) so as to switch (e.g., selectively switch) the electromagnet 332 (or all electromagnets 332) between the first condition and the second condition, as needed. The memory 348 may also store a map (e.g., a virtual map) of the work site 100 based on which the control system 340 may detect a real-time location of the work machine 140 on the work site 100 and by way of which the control system 340 may also suitably guide the work machine 140 to various locations, e.g., the predetermined locations 132, of the work site 100.

According to example stages of operation of the control system 340, in response to the instructions, and based on the execution of the set of instructions retrieved from the memory 348, the control system 340 may be configured to issue a command to move the work machine 140 for an operative engagement with the sorting assembly 144. To this end, the control system 340 may generate a retrieval command to alter the implement 260 (e.g., by manipulating the actuation system 238 associated with the forklift device 264 to either lower or raise the first fork 268 and the second fork 272) and operate the power source 242 to suitably move the work machine 140 towards the stacking platform 156 of the sorting assembly 144 so as to be in relative proximity to the predefined arrangement 196.

Based on the retrieval command, the control system 340 may switch the haul elements 276 to the first condition (or energize the corresponding electromagnets 332 associated with the haul elements 276 to activate the magnetism of the corresponding electromagnets 332). In the first condition, the haul elements 276 may be applied to retrieve the beams 120 (e.g., by magnetic force) from the sorting assembly 144 in the predefined arrangement 196. As an example, a number of the beams 120 retrieved from the sorting assembly 144 may be same as the number of haul elements 276 that may have been switched to the first condition, since those that have been switched to the first condition may be in the appropriate grasping state, e.g., in the magnetically active state to retrieve the beams 120 with magnetic force.

As the haul elements 276 may grasp the beams 120 in the predefined arrangement 196 from the stacking platform 156 of the sorting assembly 144, the control system 340 may further provide a notification to haul the retrieved beams 120 to the predetermined locations 132 of the construction area 108 of the work site 100. As an example, the control system 340 may ensure that at least one beam 120 is hauled to each predetermined location 132 such that at least one beam 120 is deposited at each predetermined location 132. For this purpose, the control system 340 may also generate release commands correspondingly at the predetermined locations 132 such that at least one haul element 276 switches from the first condition to the second condition (e.g., by de-energizing the corresponding electromagnet(s) 332) to release at least one beam 120 correspondingly at the predetermined locations 132.

In some embodiments, the beams 120 may be released correspondingly at the predetermined locations 132 in preset orientations. More particularly, the beams 120 retrieved by the haul elements 276 and released at the predetermined location 132 may be released on to a ground surface of the construction area 108 of the work site 100 in a manner that they are each deposited on the ground surface in the same orientation.

In some embodiments, the control system 340 may also control a working of the sorting assembly 144. For example, the control system 340 may also be configured to supply an activation signal to the conveyor 160 for conveyor activation (e.g., by electrical actuation) and conveyance of the beams 120 from the receptacle 152 to the stacking platform 156, in response to the instructions. The control system 340 may be further configured to actuate the vibratory unit 200 in response to the conveyor activation. In addition, as the control system 340 may be communicably coupled (e.g., through a wired connection or wirelessly) to the electromagnets 332, the control system 340 may also be configured to selectively energize and de-energize the electromagnets 332 to change or toggle the haul elements 276 mounted onto the implement 260 between the first condition and the second condition.

In some embodiments, the control system 340, in response to the notification, may be configured to determine a predefined movement sequence for moving the work machine 140 from a first predetermined location 132' at the construction area 108 to a last predetermined location 132'''' at the construction area 108 (see FIG. 1). In this regard, the control system 340 may be configured to move the work machine 140 according to the predefined movement sequence from the first predetermined location 132' up to the last predetermined location 132'''' along a machine travel path—e.g., in the reverse direction of the work machine 140. The predefined movement sequence (and many such sequences, as the need may be to cover a relatively large number of predetermined locations 132 at the construction area 108 of the work site 100) may be pre-stored in a map (that corresponds to the work site 100) which the control system 340 may selectively source or retrieve from the memory 348 to move the work machine 140 according to the predefined movement sequence(s).

In some embodiments, the control system 340 may also determine multiple routes for the work machine 140 at the work site 100. Such determination may be enabled by way of the map, e.g., between a real time location of the work machine 140 (e.g., from the storage area 112) all the way to the first predetermined location 132', so as to guide the work machine 140 to the first predetermined location 132' such that once the work machine 140 reaches the first predetermined location 132', the work machine 140 may move from the first predetermined location 132' up to the last predetermined location 132'''' along the machine travel path depositing a beam 120 at each predetermined location 132 along the machine travel path.

It will be further appreciated that the control system 340 may be configured to generate the release commands to release the beams 120 correspondingly at the predetermined locations 132 according to a release pattern. The release pattern may facilitate a progressive release of the beams 120 from the first beam 120' to the fifth or last beam 120'''' (see FIGS. 3 and 4) such the first beam 120' may be released at the first predetermined location 132' and the fifth or last beam 120'''' may be released at the fifth or last predetermined location 132''''. Notably, the first beam 120' may be disposed farthest from the frame 236 of the work machine 140 and the last beam 120'''' may be disposed closest to the frame 236 of the work machine 140.

Referring to FIGS. 11A-C, and in some embodiments, the control system 340 may correspond to a machine controller associated with the work machine 140 and may be located, at least in part, within the work machine 140 (as shown in FIG. 11A) and may be part of an electronic control module (ECM) associated with the work machine 140. In such as case, the machine controller may be in operative communication with a sorting assembly controller of the sorting assembly 144 so to control both the sorting assembly 144 and the work machine 140 in the manner as has been discussed in the present disclosure. In alternative examples, or conversely, the control system 340 may correspond to a sorting assembly controller associated with the sorting assembly 144 (as shown in FIG. 11B), and which may be in operative communication with the machine controller of the work machine 140 so to control both the sorting assembly 144 and the work machine 140 in the manner as has been discussed in the present disclosure.

Further, alternatively, the control system 340 may correspond to an independent, remote controller stationed altogether outside and/or remote to each of the work machine 140 and to the sorting assembly 144 (as shown in FIG. 11C), but which may be in operative communication (e.g., through a wired connection or wirelessly) with the machine controller associated with the work machine 140 and the sorting assembly controller associated with the sorting assembly 144, such that a working of both the work machine 140 and the sorting assembly 144 may be controlled by the remote controller. Effectively, it may be noted that controller functionality, as described above, may be performed one or more controllers and in case of multiple controllers, said functionality may be suitably shared between the multiple controllers in concerted and/or a collaborative manner to deliver the beams 120 appropriately to the predetermined locations 132 at the construction area 108 of the work site 100. Such collaboration, and variations thereof between multiple controllers, may be contemplated by someone of skill in the art based on the present disclosure and is thus not discussed.

The control system 340 may be a microprocessor-based device, and/or may be envisioned as an application-specific integrated circuit, or other logic devices, which provide controller functionality, and such devices being known to those with ordinary skill in the art. In one example, it is possible for the control system 340 to include or be representative of one or many control systems having separate or integrally configured processing units to process a variety of data (or input or commands) and/or to share one or more functionality with the one or more of the other control systems, as has been noted above. In some embodiments, a transmission of data between the control system 340 and various other controllers and/or the sensors, etc., may be facilitated wirelessly or through a wired connection, or other through other methods which are now known or in the future developed.

Processing units of the control system 340, to convert and/or process various input, command, signals, and/or the like, may include, but are not limited to, an X86 processor, a Reduced Instruction Set Computing (RISC) processor, an Application Specific Integrated Circuit (ASIC) processor, a Complex Instruction Set Computing (CISC) processor, an Advanced RISC Machine (ARM) processor, or any other processor.

Examples of the memory 348 may include a hard disk drive (HDD), and a secure digital (SD) card. Further, the memory 348 may include non-volatile/volatile memory units such as a random-access memory (RAM)/a read only memory (ROM), which may include associated input and output buses. The memory 348 may be configured to store various other instruction sets for various other functions of the work machine 140 and/or the system 136, along with the set of instructions, discussed above.

INDUSTRIAL APPLICABILITY

Referring to FIG. 12, an example method for delivering the beams 120 to the predetermined locations 132 of the work site 100 is discussed. The method is discussed by way of a flowchart 1200, in conjunction with FIGS. 1 through 11A-C. The method starts at stage 1202.

At stage 1202, as an example segment of a construction process of the solar farm 104, an operator may provide the instruction, e.g., manually via an input device, to transfer the beams 120 (e.g., correspondingly) to the predetermined locations 132. The control system 340 may receive and process the instruction. It will be appreciated that prior to the instruction, the haul elements 276 may be mounted onto the first fork 268 and the second fork 272, e.g., by having the first fork 268 and the second fork 272 correspondingly pass through the first aperture 304 and the second aperture 308 of the first engaging portion 296 and the second engaging portion 300 such that the first fork 268 and the second fork 272 may engage with the first engaging portion 296 and the second engaging portion 300. The method moves to stage 1204.

At stage 1204, in response to the instruction, the control system 340 may issue a command to move the work machine 140 for operative engagement with the sorting assembly 144. Based on the command, the control system 340 may actuate the power source 242 and control a movement of the work machine 140 such that the work machine 140 can reach up to the sorting assembly 144 and operatively engage with the sorting assembly 144. It may be noted that controlling the movement of the work machine 140, at any given point, may mean and/or include one or more of: controlling the power source 242 of the work machine 140 and/or controlling the sub-systems 246 (e.g., the braking system, the steering system, the safety system) of the work machine 140.

For operative engagement of the work machine 140 with the sorting assembly 144, the visual sensors, such as image capturing devices, or cameras mounted on the work machine 140 may capture a video feed of the work machine 140 with respect to the sorting assembly 144 and transmit the video feed to the control system 340. The control system 340 may use one or more image analyzers (not shown) to detect the edges and/or contours of the work machine 140 and the sorting assembly 144 enabling the control system 340 to determine when an orientation and/or a proximity of the work machine 140 with respect to the sorting assembly 144 is properly attained such that the work machine 140 can operatively engage with the sorting assembly 144.

Further, as part of stage 1204, the control system 340 may supply an activation signal to the conveyor 160 for conveyor activation and conveyance of the beams 120 from the receptacle 152 to the stacking platform 156 in response to the instruction. In some embodiments, the control system 340 may perform both, e.g., supply the aforesaid activation signal and issue the command to move the work machine 140 for operative engagement with the sorting assembly 144, simultaneously. In so doing, at least a first batch of the beams 120 may be stacked (or may be already in process to be stacked) in the stacking platform 156 as the work machine 140 arrives at the sorting assembly 144 for the operative engagement. Further, the control system 340 may also actuate the vibratory unit 200 in response to the conveyor activation such that vibration can be imparted to the endless belt 180 to urge the beams 120 to be correspondingly enter and be accommodated into the grooves 192.

In some embodiments, the control system 340 may determine, e.g., through one or more weight sensors (not shown) of the sorting assembly 144, a weight of the beams 120 stacked at the stacking platform 156 in the predefined arrangement 196. In such a case, if the weight is in excess of a weight threshold, the control system 340 may determine a condition in which the stacking platform 156 holds sufficient number of beams 120 and may accordingly deactivate conveyor movement and thus the conveyance of the beams 120 towards the stacking platform 156. The control system 340 may then re-activate the conveyor 160 once the weight recedes below the weight threshold. The method moves to stage 1206.

Next, at stage 1206, and as part of operatively engaging the work machine 140 with the sorting assembly 144, the control system 340 may generate a retrieval command to alter the implement 260 and switch the haul elements 276 to the first condition to retrieve the beams 120 from the sorting assembly 144 in the predefined arrangement 196. For this purpose, the control system 340 may actuate the actuation system 238 of the work machine 140 to appropriately raise (and/or lower) the first fork 268 and the second fork 272 to bring the first fork 268 and the second fork 272 up to a level such that the haul elements 276 are at an elevation with respect to the beams 120 stacked in the predefined arrangement 196 in the stacking platform 156. Thereafter, the control system 340 may control the movement of the work machine 140, e.g., to advance or retract or steer the work machine 140 appropriately such that the haul elements 276 may be correspondingly suspended above the beams 120 stacked in the predefined arrangement 196 in the stacking platform 156.

Thereafter, the control system 340 may lower the haul elements 276 (e.g., by accessing the actuation system 238 associated with the forklift device 264) such that the haul elements 276 can come closer to the beams 120 to grasp the beams 120, e.g., one haul element 276 may grasp one beam 120 by magnetic force—see FIG. 4. When lowering the haul elements 276 to retrieve and grasp the beams 120 from the stacking platform 156 (or the sorting assembly 144 in the predefined arrangement 196) by the haul elements 276, tips 328 associated with the first separator block 312 and the second separator block 316 may correspondingly allow the first separator block 312 and the second separator block 316 to enter into corresponding spaces defined consecutively between the beams 120 sorted in the predefined arrangement 196 in the stacking platform 156, causing said beams 120 to align respectively with the haul elements 276 and facilitating the haul elements 276 to respectively grasp and retain the beams 120 thereto—e.g., the beams 120 may snap correspondingly onto the haul elements 276 owing to the magnetic attraction of the corresponding electromagnets 332 in the haul elements 276.

In some embodiments, the implement 260 may include one or more weight sensors, as also described for the stacking platform 156, that the control system 340 can access to determine whether the beams 120 (e.g., a minimum number of beams 120) are indeed grasped by the haul elements 276 or not. The method moves to stage 1208.

At stage 1208, the control system 340 may provide a notification to haul the beams 120, grasped by the haul elements 276 in the predefined arrangement 196, to the predetermined locations 132. In some embodiments, pursuant to the notification, the control system 340 may source the map of the work site 100 from the memory 348 and detect a real time location of the work machine 140 (e.g., based on data from the locations sensors) and associate a point on the map corresponding to the real time location of the work machine 140. The control system 340 may also detect a predetermined location on the map (e.g., which may correspond to the first predetermined location 132' or any other predetermined location 132 defined along the predefined movement sequence) to which the work machine 140 is to travel up to for depositing (one of) the beams 120. The control system 340 may further determine a route (e.g., a virtual route on the map) from said point to said predetermined location on the map. Once the route is determined, the control system 340 may control the movement of the work machine 140 at the work site 100 in order to comply with and follow along said route such that the work machine 140 may be moved to the predetermined location 132. The method moves to stage 1210.

At stage 1210, as the work machine 140 may reach the predetermined location 132 (e.g., the first predetermined location 132') at the construction area 108, the control system 340 may compare the real time location of the work machine 140 (i.e., the point on the map) with the predetermined location on the map. Pursuant to a match between the point and the predetermined location on the map, the control system 340 may determine that the work machine 140 has arrived at the first predetermined location 132 (e.g., the first predetermined location 132'), and further that at said predetermined location 132 at least one beam 120 (e.g., first beam 120') is to be released and/or deposited.

Pursuant to the match between the point and the predetermined location on the map, the control system 340 may generate a release command at the predetermined location 132 (e.g., the first predetermined location 132') such that at least one haul element (e.g., the first haul element 276') switches from the first condition to the second condition to release at least one beam (e.g., the first beam 120') at said predetermined location 132 (e.g., the first predetermined location 132'). In this regard, the control system 340 may be configured to selectively energize and de-energize the electromagnet 332 to change the corresponding haul element 276 between the first condition and the second condition. As an example, to release the first beam 120' from the first haul element 276', the control system 340 may de-energize the electromagnet 332 associated with the first haul element 276' to accordingly change the first haul element 276' from the first condition to the second condition to release the first beam 120' at the first predetermined location 132. Similar discussion may be contemplated for each of the other beams 120 corresponding to the remaining haul elements 276 for the remaining predetermined locations 132.

Also, the beams 120 may be released correspondingly at the predetermined locations 132 in preset orientations. With regard to releasing the first beam 120' in the preset orientation (and also depositing the first beam 120' on the ground surface accordingly), the work machine 140 may use the IMU sensor (which may be a part of the sensor system 336 of the work machine 140). According to an example application, the IMU sensor may be positioned towards the front end 244 of the work machine 140, that may indicate, e.g., on the map, a direction in which the work machine 140 is facing at any given point. Such indication may be provided in conjunction with the point on the map that indicates the work machine's real time location. Based on such direction of the work machine 140 on the map, the control system 340 may estimate the orientation that the forklift device 264, the haul elements 276, and thus first beams 120 are in, at any given point.

For releasing the first beam 120' in the preset orientation, as soon as the work machine 140 acquires a predefined orientation state with respect to the first predetermined location 132' suitable for the release of the first beam 120', the control system 340 may detect the said predefined orientation state and generate the corresponding release command (e.g., a first release command) for the release of the first beam 120' at the first predetermined location 132. Such description may be applicable for every other beam 120 correspondingly grasped by every other haul element 276 and to every other predetermined location 132 at the construction area 108 of the work site 100. Although the description related to the detection of the orientation state above is described, it will be appreciated that various other orientation and detection methods, now known or in the future developed, can be applied to detect the orientation of the work machine 140 or various parts of the work machine 140. The method ends at stage 1210.

With regard to the control system 340 also determining the predefined movement sequence for moving the work machine 140 from the first predetermined location 132' to the fifth or last predetermined location 132'''', in some embodiments, the predefined movement sequence may be prestored in the memory 348. With reference to the example layout of the predetermined locations 132 in FIG. 1, a predefined movement sequence for delivering the beams 120 at those predetermined locations 132 may include a straight line machine travel path or sequence, with the work machine 140 moving in the reverse direction from the first predetermined location 132' to the fifth or last predetermined location 132'''' and stopping for beam delivery at every predetermined location 132 along said straight line machine travel path or sequence.

Therefore, once the predefined movement sequence is determined, the control system 340 may control the movement of the work machine 140 to move the work machine 140 according to the predefined movement sequence from the first predetermined location 132' up to the fifth or last predetermined location 132'''' along the machine travel path, e.g., the straight line machine travel path or sequence, in the reverse direction. Further, in process of doing do, the control system 340 may also be configured to generate the release commands to release the beams 120 correspondingly at the predetermined locations 132 (e.g., a first release command to release the first beam 120' at the first predetermined location 132', a second release command to release the second beam 120'' at the second predetermined location 132'', and so on) according to a release pattern.

The release pattern may facilitate a progressive release of the beams 120 from the first beam 120' to the fifth or last beam 120''''. For this purpose, the control system 340 may sequentially switch the haul elements 276 from the first haul element 276' to the fifth or last haul element 276'''' correspondingly from the first condition to the second condition starting from the first predetermined location 132' to the fifth or last predetermined location 132''''. In effect, the first haul element 276' is switched to the second condition from the first condition at the first predetermined location 132', the second haul element 276'' is switched to the second condition from the first condition at the second predetermined location 132'', and so on, and such may continue until the fifth or last haul element 276'''' is switched to the second condition from the first condition at the fifth or last predetermined location 132''''.

Further, as the work machine 140 may be needed to deliver the beams 120 at multiple other predetermined locations, similar to the predetermined locations 132, the memory may store (or be prestored with) multiple other predefined movement sequences for the work machine 140 that the control system can access and execute (i.e., the control system 340 may access and control a movement of the work machine 140 accordingly), such that beams 120 at those other predetermined locations can be delivered as well.

In some embodiments, the work machine 140 may travel anywhere across the work site 100, as has been described above, while avoiding obstacles along the machine's moving path. In order to do so, the control system 340 may also (periodically or regularly) obtain data from the sensor system 336, e.g., the obstacle sensor, such that a presence of an object around or ahead of the work machine 140 may be detected. Upon detecting the presence of the object, the control system 340 may reduce the speed of and/or may altogether stop the work machine 140 in its moving path.

In some embodiments, when the object is determined to be a person(s) and/or a different machine(s), the control system 340 may stop the work machine 140 for a first predefined period for the person(s) and/or the different machine(s) to move out of the moving path. When the person(s) and/or the different machine(s) is detected to be in the moving path even after a lapse of the predefined period, the control system 340 may determine an alternate moving path for the work machine 140. When the object is determined to be an inanimate object, the control system 340 may move the work machine 140 around the inanimate object and return to its moving path. If the control system 340 determines a machine or an environmental restriction or obstruction to move the work machine 140 around the inanimate object, the control system 340 may determine an alternate moving path for the work machine 140 to control a movement of the work machine along the alternate moving path.

An automated manner of delivery of the beams 120 at the predetermined locations 132 of the construction area 108 of the work site 100, as described above, eases out the overall effort to deliver (and deposit) beams 120 at the predetermined locations 132. Further, such automated delivery of the beams 120 reduces the time needed to construct the solar farm 104. Additionally, the system 136 improves safety of work site personnel, enhances work site planning and productivity, and ensures effective repeatability of construction related operations at the work site 100.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as examples only, with a true scope of the disclosure being indicated by the following claims and their equivalent.

What is claimed is:

1. A system for delivering one or more beams to one or more predetermined locations of a work site, the system comprising:

a sorting assembly configured to receive the one or more beams in loose batches and arrange the one or more beams in a predefined arrangement;

a work machine including an implement having one or more haul elements mounted thereto; and a control system configured to:

receive an instruction to transfer the one or more beams to the one or more predetermined locations;

issue a command to move the work machine for operative engagement with the sorting assembly in response to the instruction;

generate a retrieval command to alter the implement and switch the one or more haul elements to a first condition to retrieve the one or more beams from the sorting assembly in the predefined arrangement;

provide a notification to haul the one or more beams in the predefined arrangement to the one or more predetermined locations; and generate one or more release commands correspondingly at the one or more predetermined locations such that at least one haul element of the one or more haul elements switches from the first condition to a second condition to release at least one beam of the one or more beams correspondingly at the one or more predetermined locations in a preset orientation.

2. The system of claim 1, wherein the sorting assembly includes:

a receptacle to hold the one or more beams in loose batches;

a stacking platform to accumulate and stack the one or more beams; and a conveyor including an endless belt operably extending from the receptacle to the stacking platform, wherein the control system is configured to supply an activation signal to the conveyor for conveyor activation and conveyance of the one or more beams from the receptacle to the stacking platform in response to the instruction.

3. The system of claim 2, wherein the endless belt defines grooves serially arranged in regular intervals along a travel path of the endless belt from the receptacle to the stacking platform, wherein the grooves are configured to correspondingly accommodate the one or more beams, at least partially, therewithin, and guide the one or more beams toward the predefined arrangement.

4. The system of claim 3, wherein the conveyor includes a vibratory unit to impart vibration to the endless belt to urge the one or more beams to be correspondingly accommodated into the grooves, wherein the control system is configured to actuate the vibratory unit in response to the conveyor activation.

5. The system of claim 1, wherein the implement includes a forklift device including one or more forks raisable and lowerable with respect to a frame of the work machine, each haul element of the one or more haul elements including one or more engaging portions for correspondingly engaging with the one or more forks.

6. The system of claim 1, wherein each haul element of the one or more haul elements includes one or more separator blocks to maintain a clearance between one haul element of the one or more haul elements and an adjacent haul element of the one or more haul elements.

7. The system of claim 6, wherein each separator block of the one or more separator blocks includes a tapered portion defining a tip, wherein to retrieve the one or more beams from the sorting assembly in the predefined arrangement by the one or more haul elements, tips associated with the one or more separator blocks correspondingly allow the one or more separator blocks to enter into corresponding spaces defined consecutively between the one or more beams sorted in the predefined arrangement, causing said one or more beams to respectively align with the one or more haul elements and facilitating the one or more haul elements to respectively grasp and retain the one or more beams thereto.

8. The system of claim 1, wherein each haul element of the one or more haul elements includes an electromagnet to respectively attract and retain at least one beam of the one or more beams thereto, wherein the control system is configured to selectively energize and de-energize the electromagnet to change each haul element of the one or more haul elements between the first condition and the second condition.

9. The system of claim 1, wherein, in response to the notification, the control system is configured to:

determine a predefined movement sequence for moving the work machine from a first predetermined location of the one or more predetermined locations to a last predetermined location of the one or more predetermined locations; and move the work machine according to the predefined movement sequence from the first predetermined location up to the last predetermined location along a machine travel path.

10. The system of claim 9, wherein:

the control system is configured to generate the one or more release commands to release the one or more beams correspondingly at the one or more predetermined locations according to a release pattern, the release pattern facilitates a progressive release of the one or more beams from a first beam of the one or more beams to a last beam of the one or more beams, and the first beam is disposed farthest from a frame of the work machine and the last beam being disposed closest to the frame of the work machine.

11. A method for delivering one or more beams to one or more predetermined locations of a work site, the method comprising:

receiving, by a control system, an instruction to transfer the one or more beams to the one or more predetermined locations;

issuing, by the control system, a command to move a work machine for operative engagement with a sorting assembly in response to the instruction, the sorting assembly configured to receive the one or more beams in loose batches and arrange the one or more beams in a predefined arrangement, the work machine including an implement having one or more haul elements mounted thereto;

generating, by the control system, a retrieval command to alter the implement and switch the one or more haul elements to a first condition to retrieve the one or more beams from the sorting assembly in the predefined arrangement;

providing, by the control system, a notification to haul the one or more beams in the predefined arrangement to the one or more predetermined locations; and generating, by the control system, one or more release commands correspondingly at the one or more predetermined locations such that at least one haul element of the one or more haul elements switches from the first condition to a second condition to release at least one beam of the one or more beams correspondingly at the one or more predetermined locations in a preset orientation.

12. The method of claim 11, wherein the sorting assembly includes:

a receptacle to hold the one or more beams in loose batches;

a stacking platform to accumulate and stack the one or more beams; and a conveyor including an endless belt operably extending from the receptacle to the stacking platform, the method further including:

supplying, by the control system, an activation signal to the conveyor for conveyor activation and conveyance of the one or more beams from the receptacle to the stacking platform in response to the instruction.

13. The method of claim 12, wherein the endless belt defines grooves serially arranged in regular intervals along a travel path of the endless belt from the receptacle to the stacking platform, wherein the grooves are configured to correspondingly accommodate the one or more beams, at least partially, therewithin, and guide the one or more beams toward the predefined arrangement.

14. The method of claim 13, wherein the conveyor includes a vibratory unit to impart vibration to the endless belt to urge the one or more beams to be correspondingly accommodated into the grooves, the method further including:

actuating, by the control system, the vibratory unit in response to the conveyor activation.

15. The method of claim 11, wherein the implement includes a forklift device including one or more forks raisable and lowerable with respect to a frame of the work machine, each haul element of the one or more haul elements including one or more engaging portions for correspondingly engaging with the one or more forks.

16. The method of claim 11, wherein each haul element of the one or more haul elements includes one or more separator blocks to maintain a clearance between one haul element of the one or more haul elements and an adjacent haul element of the one or more haul elements.

17. The method of claim 16, wherein:

each separator block of the one or more separator blocks includes a tapered portion defining a tip, wherein to retrieve the one or more beams from the sorting assembly in the predefined arrangement by the one or more haul elements, tips associated with the one or more separator blocks correspondingly allow the one or more separator blocks to enter into corresponding spaces defined consecutively between the one or more beams sorted in the predefined arrangement, causing said one or more beams to respectively align with the one or more haul elements and facilitating the one or more haul elements to respectively grasp and retain the one or more beams thereto.

18. The method of claim 11, wherein each haul element of the one or more haul elements includes an electromagnet to respectively attract and retain at least one beam of the one or more beams thereto, the method further including:

selectively energizing and de-energizing, by the control system, the electromagnet to change each haul element of the one or more haul elements between the first condition and the second condition.

19. The method of claim 11 further including:

determining, by the control system, a predefined movement sequence for moving the work machine from a first predetermined location of the one or more predetermined locations to a last predetermined location of the one or more predetermined locations; and moving, by the control system, the work machine according to the predefined movement sequence from the first predetermined location up to the last predetermined location along a machine travel path.

20. The method of claim 19, wherein:

the control system is configured to generate the one or more release commands to release the one or more beams correspondingly at the one or more predetermined locations according to a release pattern, the release pattern facilitates a progressive release of the one or more beams from a first beam of the one or more beams to a last beam of the one or more beams, and the first beam is disposed farthest from a frame of the work machine and the last beam being disposed closest to the frame of the work machine.

* * * * *